United States Patent [19]

Thaler

[11] Patent Number: 4,925,238
[45] Date of Patent: May 15, 1990

[54] VEHICLE SUNROOF SHADE

[76] Inventor: Doug Thaler, 2608 E. Sahuaro Rd., Phoenix, Ariz. 85028

[21] Appl. No.: 304,420

[22] Filed: Jan. 31, 1989

[51] Int. Cl.$^5$ .............................................. B60J 7/10
[52] U.S. Cl. .................................... 296/218; 296/219; 160/267.1; 160/268.1
[58] Field of Search ....................... 296/218, 219, 214; 160/266, 270, 272, 267.1, 268.1

[56] References Cited

U.S. PATENT DOCUMENTS

| | | | |
|---|---|---|---|
| 3,658,378 | 4/1972 | Sutren | 296/219 |
| 3,819,227 | 6/1974 | Carli | 296/219 |
| 4,209,196 | 6/1980 | Moulin | 296/219 |
| 4,422,686 | 12/1983 | Droz | 296/219 |
| 4,475,764 | 10/1984 | Hutchinson et al. | 296/136 |
| 4,639,035 | 1/1987 | Isaacson | 296/218 |

Primary Examiner—Robert R. Song
Attorney, Agent, or Firm—Jerry T. Kearns

[57] ABSTRACT

A roller shade for use in vehicles having a T-top roof with a pair of removable sections separated by a central T-bar may be factory installed on the vehicle or retrofitted by a consumer. The roller shade includes an elongated cylindrical housing which receives a spring loaded shade roller. A pair of guide track assemblies extend from opposite ends of the cylindrical housing and are provided with spring loaded detents for engagement with mounting apertures for the removable roof sections. A clamping assembly extends from a back portion of the cylindrical housing for engagement with a channel formed in the vehicle roof T-bar. The shade is preferably formed from a tinted plastic material and is provided with a pair of rollers received in the parallel guide tracks. A key lock mechanism allows the shade to be secured in a closed position. In a second embodiment, a pair of overlying sunshades are provided for allowing the amount of sunlight entering the vehicle sunroof to be regulated by utilizing one or both of the shades.

8 Claims, 3 Drawing Sheets

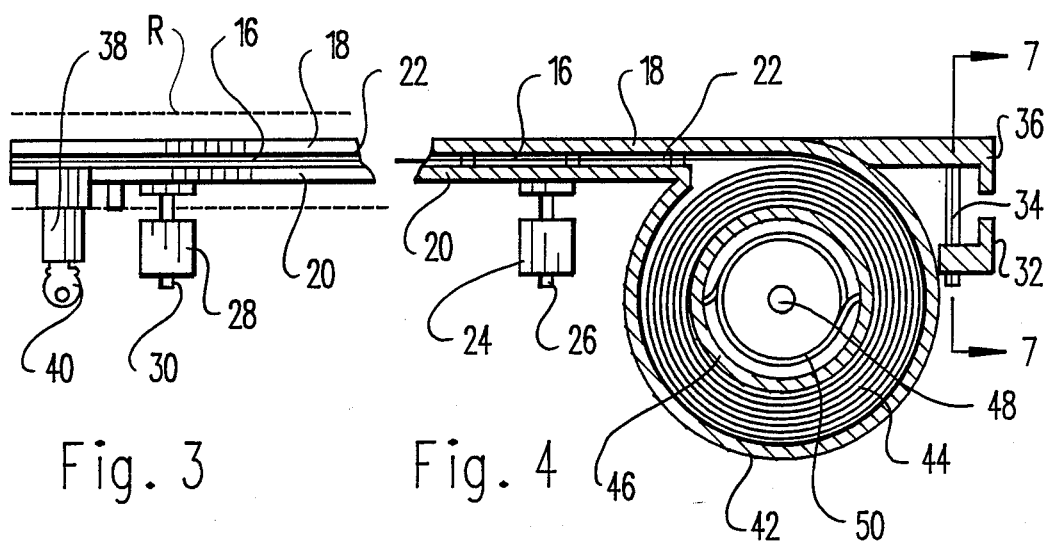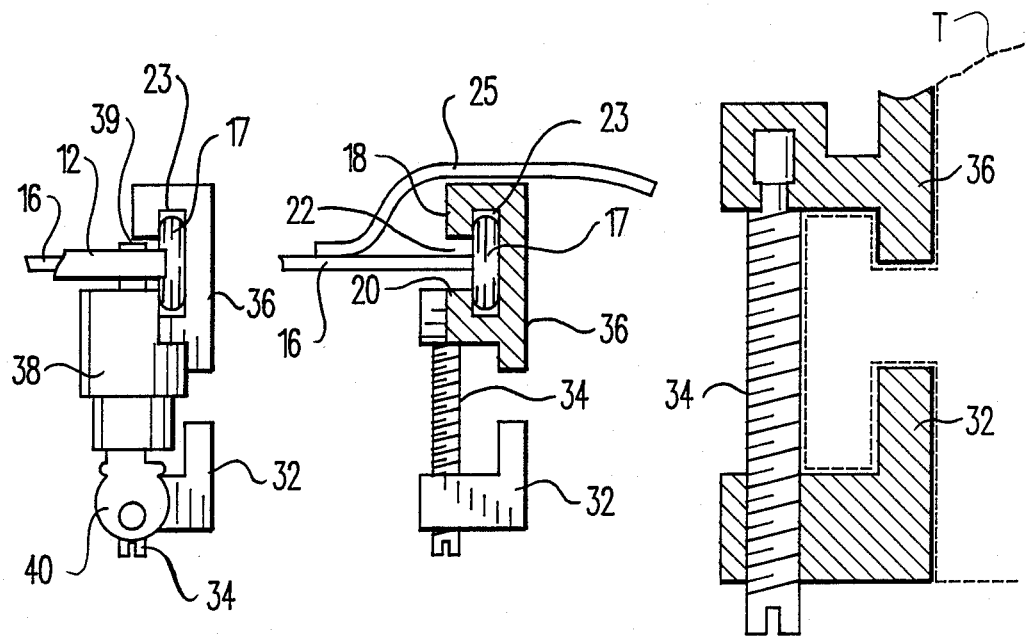

VEHICLE SUNROOF SHADE

BACKGROUND OF THE INVENTION

1. Field of the Invention

The present invention relates to shades, and more particularly pertains to a spring roller shade for use on vehicles having sunroofs of the type formed by removing a pair of rigid sections from a T-roof of a vehicle. The problem with vehicles having T-roofs is the difficulty of taking them off and putting them on every time that you stop somewhere. Individuals must be constantly alert if it is going to start raining while they are eating lunch or running other brief errands. Additionally, with the rigid T-roof sections removed, the vehicle is open and allows easy access to the interior of the vehicle by thieves. The present invention solves these problems by providing a shade that may either be originally built into the central T-bar of the vehicle or which may be retrofitted by a consumer.

2. Description of the Prior Art

Various types of shades are known in the prior art. A typical example of such a vehicle sunroof shade is to be found in U.S. Pat. No. 3,658,378, which issued to C. Sutren on April 25, 1972. This patent discloses a vehicle having a sunroof covered by an accordion fold shade. U.S. Pat. No. 3,819,227, which issued to R. Carli on June 25, 1974, discloses a motor vehicle sunroof having a flexible cover tensioned between a front cross member of the vehicle and a rear roll bar by two pivotal levers. When the cover is open, the flexible roof portion is rolled up and accommodated in a receptacle formed in the roll bar. U.S. Pat. No. 4,209,196, which issued to J. Mocelin on June 24, 1980, discloses a flexible sunroof for cars comprising a frame movable forwardly and rearwardly in a rectangular roof opening of the car and having a flexible cover connected at one end to the frame and at an opposite end to the rear edge of the opening. The cover is stretched in its closed position to cover the opening and folded rearwardly in the open position. U.S. Pat. No. 4,422,686, which issued to R. Droz on Dec. 27, 1983, discloses a flexible cover for a vehicle sunroof which is mounted in guide tracks for selectively closing a vehicle sunroof opening. U.S. Pat. No. 4,475,764, which issued to M. Hutchinson et al on Oct. 9, 1984, discloses a sunroof cover having frame members supported on a rear window of the vehicle.

While the above mentioned devices are suited for their intended usage, none of these devices disclose a spring roller shade for use on T-top vehicles having a pair of removable sections separated by a fixed T-bar. Additionally, none of the above devices disclose a spring roller shade which may easily be retrofitted by a consumer to a vehicle having a T-top. An additional feature of the present invention, not contemplated by the aforesaid prior art devices, is the provision of a pair of overlying tinted retractable shades for selectively varying the amount of light admitted to the interior of a vehicle. Inasmuch as the art is relatively crowded with respect to these various types of shades, it can be appreciated that there is a continuing need for and interest in improvements to such shades, and in this respect, the present invention addresses this need and interest.

SUMMARY OF THE INVENTION

In view of the foregoing disadvantages inherent in the known types of shades now present in the prior art, the present invention provides an improved vehicle sunroof shade. As such, the general purpose of the present invention, which will be described subsequently in greater detail, is to provide a new and improved vehicle sunroof shade which has all the advantages of the prior art shades and none of the disadvantages.

To attain this, representative embodiments of the concepts of the present invention are illustrated in the drawings and make use of a roller shade for use in vehicles having a T-top roof with a pair of removable sections separated by a central T-bar may be factory installed on the vehicle or retrofitted by a consumer. The roller shade includes an elongated cylindrical housing which receives a spring loaded shade roller. A pair of guide track assemblies extend from opposite ends of the cylindrical housing and are provided with spring loaded detents for engagement with mounting apertures for the removable roof sections. A clamping assembly extends from a back portion of the cylindrical housing for engagement with a channel formed in the vehicle roof T-bar. The shade is preferably formed from a tinted plastic material and is provided with a pair of rollers received in the parallel guide tracks. A key lock mechanism allows the shade to be secured in a closed position. In a second embodiment, a pair of overlying sunshades are provided for allowing the amount of sunlight entering the vehicle sunroof to be regulated by utilizing one or both of the shades.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle sunroof shade which has all the advantages of the prior art shades and none of the disadvantages.

It is another object of the present invention to provide a new and improved vehicle sunroof shade which may be easily and efficiently manufactured and marketed.

It is a further object of the present invention to provide a new and improved vehicle sunroof shade which is of a durable and reliable construction.

An even further object of the present invention is to provide a new and improved vehicle sunroof shade which is susceptible of a low cost of manufacture with regard to both materials and labor, and which accordingly is then susceptible of low prices of sale to the consuming public, thereby making such shades economically available to the buying public.

Still yet another object of the present invention is to provide a new and improved vehicle sunroof shade which provides in the apparatuses and methods of the prior art some of the advantages thereof, while simultaneously overcoming some of the disadvantages normally associated therewith.

Still another object of the present invention is to provide a new and improved vehicle sunroof shade which may be easily retrofitted in T-top equipped vehicles.

Yet another object of the present invention is to provide a new and improved vehicle sunroof shade for use in vehicles having a T-top which allows the roof openings to be rapidly and conveniently closed.

Even still another object of the present invention is to provide a new and improved vehicle sunroof shade for vehicles of the type having a T-roof which includes a pair of retractable overlying tinted shades for regulating the amount of sunlight admitted to the interior of the vehicle These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3, taken along line 3—3 of FIG. 2, illustrates the guide channel which receives a longitudinal side edge of the retractable shade.

FIG. 4 is a cross sectional view, taken along line 4—4 of FIG. 2, illustrating the roller shade housing and guide channel assembly.

FIG. 5 is an end view illustrating the guide channel and lock assembly.

FIG. 6 is a transverse cross sectional view, further illustrating the shade guide channel assembly and additionally illustrating an optional sealing flap.

FIG. 7 is a transverse cross sectional view, taken along line 7—7 of FIG. 4, illustrating the clamp mounting assembly.

DESCRIPTION OF THE PREFERRED EMBODIMENT

Figure 1:
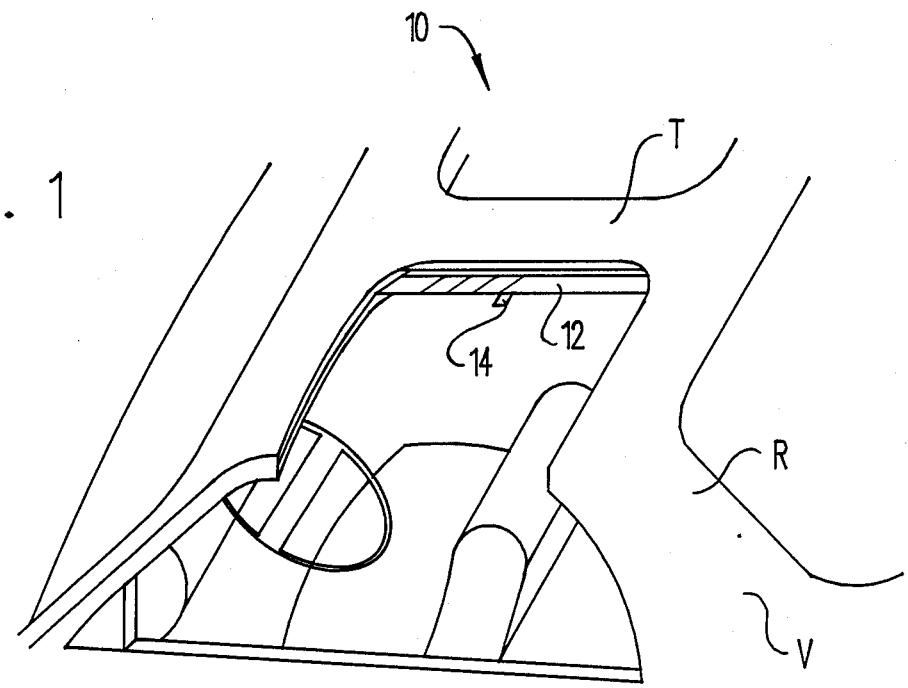
FIG. 1 is a perspective view illustrating a T-roof vehicle with the shade of the present invention in an open position.

With reference now to the drawings, and in particular to FIG. 1 thereof, a new and improved vehicle sunroof shade embodying the principles and concepts of the present invention and generally designated by the reference numeral 10 will be described.

More specifically, it will be noted that the first embodiment 10 of the invention includes a transverse rigid reinforcement strip 12 secured to a leading edge of a spring roller shade retracted beneath the central T-bar T of a vehicle V having a T-roof R. The vehicle has a conventional T-roof of the type having two rigid removable sections separated by a central T-bar T. When the removable sections are removed as illustrated, openings are formed above the driver and passenger seats within the vehicle V. The removable sections are usually stored in the trunk of the vehicle and are cumbersome and difficult to reinstall. In order to overcome this problem, the present invention provides an easily installed retractable shade for selectively covering the open sections. A pull tab 14 may be provided on the reinforcement strip 12 for extending the shade.

Figure 2:
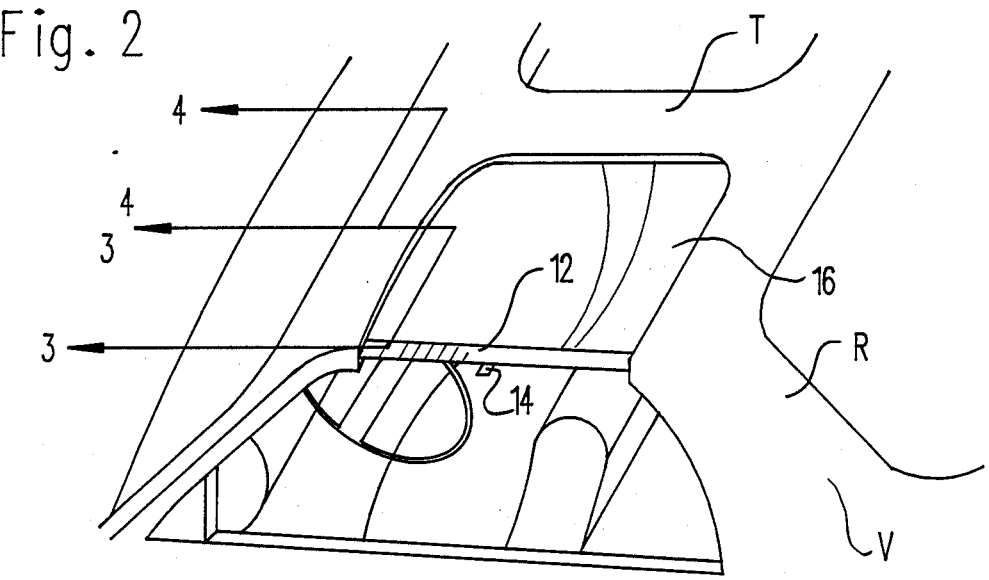
FIG. 2 is a perspective view of a T-roof vehicle having the shade of the present invention in a closed position.

FIG. 2 illustrates a perspective view with the shade 16 in a fully extended position. The shade 16 is preferably formed from a tinted flexible plastic material, although it may be formed from opaque materials without departing from the scope of the present invention.

FIG. 3 illustrates a detail view of a guide track installed in the notched roof portions R surrounding the opening formed by the removable sections. The notched portion is conventionally provided for reception of the removable roof section. The guide track includes an upper portion 18 separated by a longitudinal groove 22 from a lower portion 20. The longitudinal side edge of the shade 16 is received for reciprocal sliding movement in the groove 22. A spring biased detent pin 30 extends from a detent housing 28 secured to the bottom guide track portion 20. The detent pin 30 is dimensioned for engagement with originally provided notches in the T-roof portion for engagement with retaining pins provided on the removable T-roof section. Thus, the shade roller assembly may be retrofitted without any modification to the existing vehicle structure. A locking cylinder 38 is secured adjacent one end of the guide track for locking the shade 16 in a fully extended position.

FIG. 4 illustrates a cross sectional view, taken along line 4—4 of FIG. 2, which illustrates a cylindrical housing 42 which extends between a pair of parallel guide track assembly. While only one guide track assembly 18 is illustrated, it should be understood that the opposite parallel guide track is similarly constructed. A clamping assembly is provided along a rear edge of the cylindrical shade roller housing 42 and includes a first clamp section 32 connected to a second clamp section 36 by a threaded screw 34. The clamping sections 32 and 36 are dimensioned for engagement with the originally provided groove in the central T-bar of the vehicle. The housing 42 holds a rolled section of the shade 44 on a cylindrical hub 46 mounted for rotation on an axle 48. A torsional coil spring 50 biases the hub 46 for retraction of the shade 16 onto the coil 44. In use, the shade roller assembly is installed by engagement of the clamping assembly 32 and 36 by tightening the clamp screw 34 and by positioning the detent pins 26 and 30 on the parallel guide tracks in the originally notches on the vehicle roof. Once installed, the shade 16 may be easily extended to cover the opening, and locked in place utilizing the key 40.

FIG. 5 provides a front end view which illustrates the locking cylinder 38 secured to the guide track assembly. The lock cylinder 38 includes an axially movable plunger 39 which is illustrated in an extended position in engagement with an aperture provided through the transverse reinforcement strip 12 on the leading edge of the shade 16. A roller 17 is secured at each end of the reinforcement strip 12 and is rotatably mounted thereto for sliding movement within an interior slot 23 in the guide track assembly. The roller mounting of the shade 16 allows the shade to be retracted and extended smoothly, with a minimum of resistance.

FIG. 6 illustrates a transverse cross sectional view of the guide track assembly, which illustrates a flexible sealing flap 25 which may optionally be provided adjacent each longitudinal side edge of the shade 16. The sealing flap 25, in use, engages over the top side edges of the vehicle roof, and serves to prevent entry of moisture into the interior of the vehicle.

FIG. 7 illustrates a cross sectional view, taken along line 7—7 of FIG. 4, which illustrates the constructional details of the housing clamping assembly. The clamp members 32 and 36 are shown in engagement with the conventional T-bar roof portion T.

Figure 8:
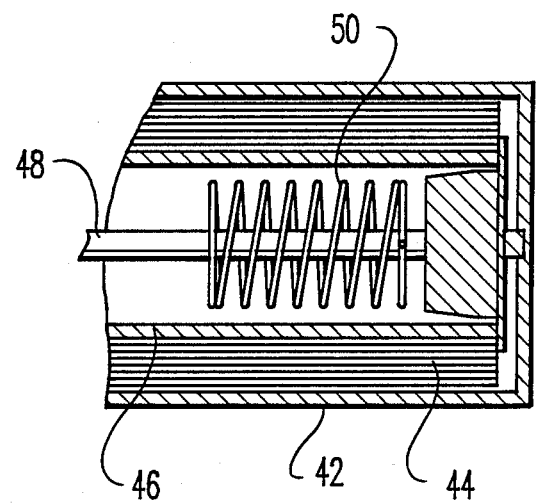
FIG. 8 is a longitudinal cross sectional view, illustrating the spring roller shade assembly.

FIG. 8 illustrates a partial longitudinal cross sectional view, which illustrates the construction of the shade roller assembly. The cylindrical housing 42 is provided with a cylindrical hub 46 mounted on an axle 48. The torsional coil spring 50 biases the hub 46 to retract the shade onto a coil 44.

Figure 9:
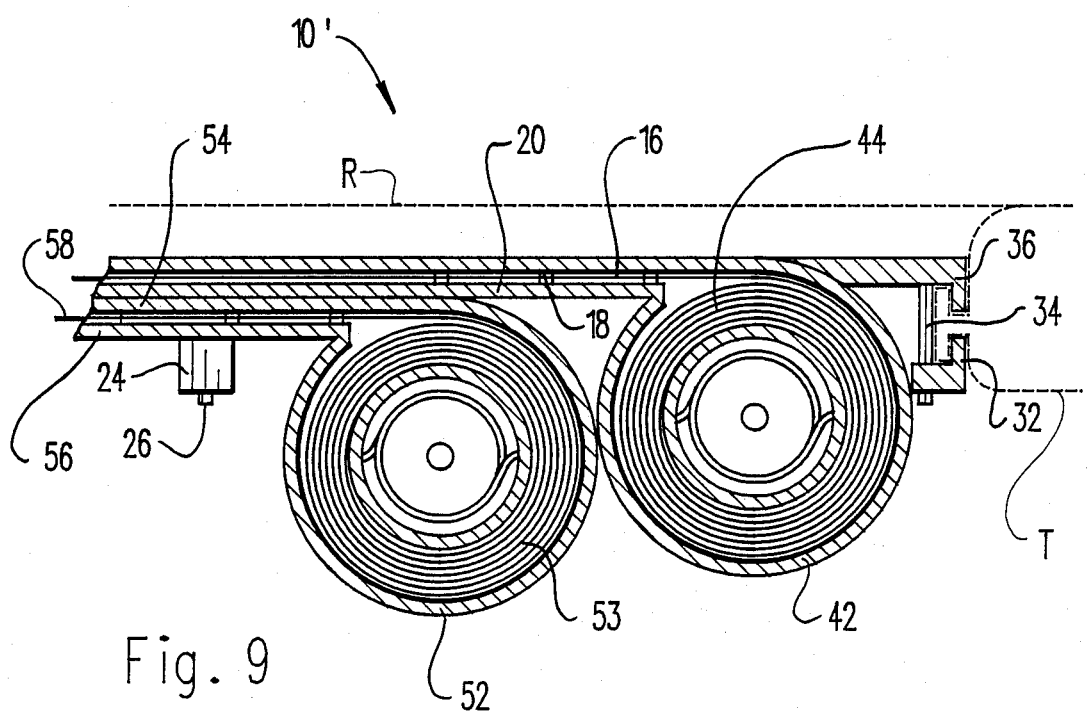
FIG. 9 is a cross sectional view, illustrating a second embodiment of the present invention, which utilizes a pair of overlying tinted shades.

FIG. 9 illustrates a slightly modified second embodiment 10' according to the present invention. In the second embodiment, a second cylindrical housing 52 is provided which includes a second shade coil 53 having a shade 58 mounted in a channel formed by guide track portions 54 and 56. The first shade 16 overlies the second shade 58, and either shade 16 or 58 may be selectively retracted or extended. When both shades 16 and 58 are extended, the amount of sunlight admitted to the vehicle interior is reduced. By forming the shade 16 and 58 with different tints, the individual may regulate the sunlight in three discreet levels.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle sunroof shade for vehicles having T-tops with a pair of removable sections separated by a central T-bar, comprising:
   a pair of parallel guide tracks;
   a housing extending transversely between first ends of said guide tracks;
   means for securing said housing to the central T-bar of a vehicle;
   a retractable spring roller shade in said housing and having opposite longitudinal side edges dimensioned for reciprocal sliding movement in said guide tracks;
   and means for securing said guide tracks to a vehicle T-roof portion.

2. The vehicle sunroof shade of claim 1, further comprising means for locking said shade in a closed position.

3. The vehicle sunroof shade of claim 1, wherein said locking means comprises a rigid reinforcement strip secured to a leading transverse edge of said shade;
   an aperture in said strips;
   and a locking cylinder secured to one of said guide tracks having a retractable plunger for selective engagement with said aperture.

4. The vehicle sunroof shade of claim 1, further comprising a plurality of overlying tinted roller shades for selectively regulating light admitted to a vehicle sunroof.

5. The vehicle sunroof shade of claim 1, further comprising roller means secured to opposite longitudinal side edges of said shade and received in said guide tracks.

6. The vehicle sunroof shade of claim 1, wherein said means for securing said guide tracks comprises a plurality of spring biased detent pins dimensioned for engagement with originally provided retaining notches for the removable sections of a T-top of a vehicle.

7. The vehicle sunroof shade of claim 1, further comprising a pair of flexible sealing flaps secured to opposite longitudinal side portions of said shade.

8. A vehicle sunroof shade for vehicles having T-tops with a pair of removable sections separated by a central T-bar, comprising:
   a pair of elongated parallel guide tracks;
   an elongated cylindrical housing extending transversely between first ends of said guide tracks;
   a retractable spring roller shade in said housing, opposite longitudinal side edges of said shade received for sliding movement in said guide tracks;
   a clamp assembly along a back side of said housing for securement to the central T-bar of a vehicle;
   a plurality of spring detent pins on each of said guide tracks dimensioned for engagement with securement notches on a vehicle for retaining the removable vehicle move sections;
   a pair of flexible sealing flaps secured to opposite longitudinal side portions of said shades;
   a rigid reinforcement strip secured to a leading transverse edge of said shade;
   and a locking mechanism secured to one of said guide tracks for selective engagement with said reinforcement strip to lock said shade in a closed position over a vehicle roof opening.

* * * * *